(12) United States Patent
Roberts

(10) Patent No.: US 8,718,918 B2
(45) Date of Patent: May 6, 2014

(54) DETERMINING RELATIVE POSITIONING INFORMATION

(76) Inventor: Richard D. Roberts, Hillsboro, OR (US)

( * ) Notice: Subject to any disclaimer, the term of this patent is extended or adjusted under 35 U.S.C. 154(b) by 0 days.

(21) Appl. No.: 13/977,671

(22) PCT Filed: Apr. 26, 2012

(86) PCT No.: PCT/US2012/035117
§ 371 (c)(1),
(2), (4) Date: Oct. 7, 2013

(87) PCT Pub. No.: WO2013/162559
PCT Pub. Date: Oct. 31, 2013

(65) Prior Publication Data
US 2014/0025284 A1   Jan. 23, 2014

(51) Int. Cl.
*G05D 1/02* (2006.01)
*B60W 30/16* (2012.01)
*G08G 1/16* (2006.01)
*G08G 1/00* (2006.01)

(52) U.S. Cl.
CPC ......... *B60W 30/16* (2013.01); *B60W 2550/143* (2013.01); *G05D 1/0274* (2013.01); *G08G 1/16* (2013.01); *G05D 1/024* (2013.01); *G05D 1/0278* (2013.01); *G05D 2201/0213* (2013.01); *G08G 1/22* (2013.01)
USPC .................. 701/300; 701/23; 701/93; 701/96; 701/301; 340/436; 340/932.2

(58) Field of Classification Search
CPC .. B60W 30/16; B60W 2550/143; G08D 1/16; G05D 1/024; G05D 1/0278; G05D 2201/0213; G08G 1/22
USPC ................ 701/12, 93, 96, 300, 301; 340/436, 340/932.2
See application file for complete search history.

(56) References Cited

U.S. PATENT DOCUMENTS 6,831,591 B2* 12/2004 Horibe ............................ 342/52
7,710,246 B2* 5/2010 Arakawa et al. .............. 340/435
(Continued)

FOREIGN PATENT DOCUMENTS

| WO | 2011/128739 A1 | 10/2011 |
| WO | 2013/048502 A1 | 4/2013 |
| WO | 2013/081595 A1 | 6/2013 |

OTHER PUBLICATIONS

International Search Report and Written opinion received for PCT Application No. PCT/US2012/035117, mailed on Dec. 21, 2012, 9 pages.

(Continued)

*Primary Examiner* — McDieunel Marc
(74) *Attorney, Agent, or Firm* — Sutherland Asbill & Brennan LLP

(57) ABSTRACT

A signal detecting unit configured to be associated with a first vehicle includes one or more signal sensors and one or more processors and is configured to receive one or more signals from one or more signal sources is associated with a second vehicle. A set of time values is determined based on arrival times of the signal(s), and a set of distance expressions is generated. A set of distance equations is generated based on the set of time values and the set of distance expressions, and the set of distance equations is solved to determine one or more positions associated with the first vehicle or the one or more signal sources within a defined coordinate system.

23 Claims, 8 Drawing Sheets

(56) References Cited

U.S. PATENT DOCUMENTS

| | | | |
|---|---|---|---|
| 7,864,032 B2* | 1/2011 | Kogure et al. | 340/435 |
| 8,050,863 B2* | 11/2011 | Trepagnier et al. | 701/514 |
| 8,145,393 B2* | 3/2012 | Foster et al. | 701/50 |
| 8,346,480 B2* | 1/2013 | Trepagnier et al. | 701/514 |
| 2008/0243351 A1* | 10/2008 | Isogai et al. | 701/96 |
| 2009/0237293 A1 | 9/2009 | Sakuma | |
| 2011/0144941 A1 | 6/2011 | Roberts et al. | |

OTHER PUBLICATIONS

Bucher et al., "A Synthesizable VHDL Model of the Exact Solution for Three-dimensional Hyperbolic Positioning System", Department of Electrical and Computer Engineering, New Jersey Center for Wireless and Telecommunication, New Jersey Institute of Technology, Newark, NJ 07102, USA, Volume No. 15, Oct. 3, 2001, pp. 507-520.

* cited by examiner

DETERMINING RELATIVE POSITIONING INFORMATION

TECHNICAL FIELD

This disclosure relates generally to determining relative positioning information using one or more signal sensors and one or more signal sources, and more particularly, to determining relative positioning information between vehicles.

BACKGROUND

Various object-detection systems and techniques exist. For example, Sound Navigation and Ranging (SONAR) is a technique that uses the propagation of sound waves to navigate or to communicate with or detect objects. SONAR may be used for acoustic location in both water and in the air, but has generally been supplanted by Radio Detection and Ranging (RADAR) for determining the range, speed, and so forth, of objects in the air. SONAR encompasses two primary types of ranging and detection schemes including passive SONAR, which involves listening for the sound made by vessels, and active SONAR, which involves emitting pulses of sounds and listening for echoes that are generated. While SONAR is a relatively inexpensive technology and is fairly accurate at short range, SONAR offers a relatively poor resolution compared to RADAR and other ranging technologies.

RADAR is an object detection system that makes use of radio waves to determine the range, altitude, speed, and so forth of objects. RADAR technology generally includes a transmitter that transmits pulses of radio waves or microwaves that bounce off of objects in their path. The objects return a portion of the wave's energy to a dish or antenna typically located in proximity to the transmitter. RADAR is not capable of directly determining position information between objects (e.g., an angular relationship between objects), which instead must be inferred from the range determination and an angle of the antenna. RADAR is a relatively expensive technology that provides better accuracy at longer ranges and better resolution than SONAR, for example.

Another sensing and ranging technology—Light Detection and Ranging (LIDAR)—is an optical remote sensing technology capable of measuring the distance to, or other properties of, a target, by illuminating the target with a pulse of light in the ultraviolet, visible, or near infrared spectrum from a Light Amplification by Stimulated Emission of Radiation (laser) source. LIDAR systems include both coherent and incoherent detection systems, each of which further encompasses two types of pulse models—micropulse and high energy systems. Micropulse systems use considerably less energy in the laser and are typically "eye-safe." High energy systems are more commonly employed in conducting atmospheric research. LIDAR sensors mounted on mobile platforms (e.g., vehicles, satellites, etc.) require instrumentation to determine the absolute position and orientation of the sensor. Such instrumentation generally includes a Global Positioning System (GPS) receiver and an Inertial Measurement Unit (IMU). Similar to RADAR, LIDAR is only capable of determining a distance between objects; any determination of position information between objects must be inferred indirectly. While LIDAR generally offers better accuracy and higher resolution than other ranging technologies, such as SONAR and RADAR, LIDAR is also considerably more expensive to implement.

BRIEF DESCRIPTION OF THE FIGURES

Throughout the detailed description that follows, reference will be made to the accompanying drawings, which form part of this disclosure. The accompanying drawings are not necessarily drawn to scale. A brief description of each drawing follows.

DETAILED DESCRIPTION OF EMBODIMENTS OF THE DISCLOSURE

Embodiments of the disclosure relate to systems, methods, apparatuses, and computer-readable media for determining relative positioning information using one or more signal sensors and one or more signal sources. One or more specific embodiments of the disclosure relate to systems, methods, apparatuses, and computer-readable media for determining one or more positions of a first vehicle with respect to a second vehicle or vice versa, where the first vehicle has one or more signal sensors associated therewith that detect one or more signals received from one or more signal sources associated with the second vehicle.

Embodiments of the disclosure are described more fully hereinafter through reference to the accompanying drawings, in which certain embodiments of the disclosure are shown. This disclosure may, however, be embodied in many different forms and should not be construed as limited to the embodiments set forth herein; rather, these embodiments are provided so that this disclosure will be thorough and complete, and fully convey the scope of the disclosed subject matter to those skilled in the art. Like numbers refer to like elements throughout.

Example embodiments of the disclosure will now be described with reference to the accompanying figures.

Figure 1A:
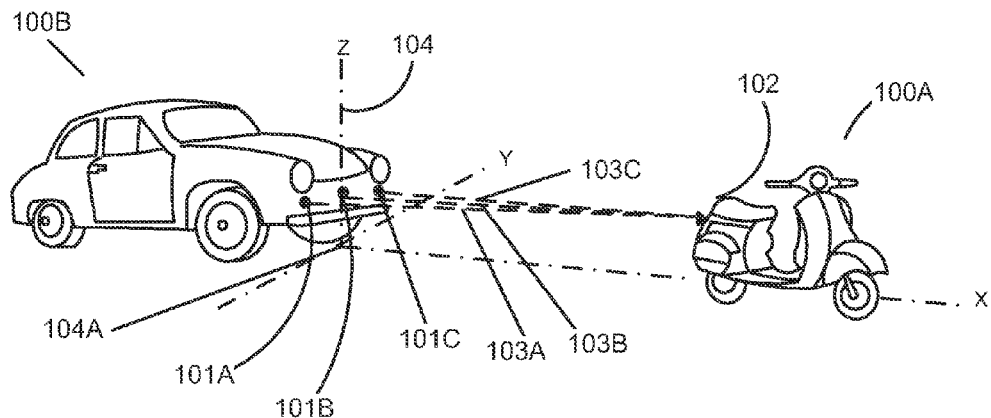
FIG. 1A is a schematic representation of an interaction between vehicles employing a system in accordance with an embodiment of the disclosure.

FIG. 1A is a schematic depiction of an interaction between two vehicles employing a system in accordance with one or more embodiments of the disclosure. Throughout this disclosure, the term vehicle may refer to, but is not limited to, cars, motorcycles, mopeds, scooters, bicycles, other two-wheeled vehicles, all-terrain vehicles (ATVs), trucks, light-duty trucks, heavy-duty trucks, pickup trucks, minivans, crossover utility vehicles (CUVs), vans, commercial vehicles, private vehicles, sport utility vehicles (SUVs), tractor-trailers, airplanes, helicopters, other aircraft, spacecraft, satellites, or any other suitable mobile object provided with communicative and sensory capabilities. However, it should be appreciated that embodiments of the disclosure may also be utilized in other transportation or non-transportation related applications where electronic communications between two systems may be implemented.

Further, throughout this disclosure the term "position" or "position vector" may refer to a vector in three-dimensional space (e.g., <x, y, z>). Various embodiments of the disclosure relate to solving for the positions of objects within a defined coordinate system. In one or more embodiments of the disclosure, the z-coordinate may be known, in which case, techniques according to such embodiments may involve solving for only the x and y coordinates of the position vector. In addition, in one or more embodiments of the disclosure, the term "distance" may refer to the hypotenuse (or magnitude) of a position vector.

Referring to FIG. 1A, a first vehicle 100A may have a signal sensor 102 associated therewith. Referring to FIG. 1C, the signal sensor 102 may form at least part of a signal detecting unit 108 associated with the vehicle 100A. The signal detecting unit 108 may additionally comprise one or more processors 109, a memory 110 operatively coupled to the one or more processors 109, and a phase difference detector 111 operatively coupled to the memory 110. The phase difference detector 111 and/or the one or more processors 109 may comprise one or more digital signal processors (DSPs). The first vehicle 100A may further comprise one or more vehicle control units 112 and one or more input/output control units 113 configured to be controlled by the one or more processors 109. The one or more vehicle control units 112 may be configured to control operations of one or more vehicle components 114. The one or more input/output control units 113 may be configured to control a user interface (UI) 115 provided in connection with the vehicle 100A.

A second vehicle 100B may comprise three signal sources 101A-101C. Referring to FIGS. 1A and 1C, the signal sources 101A-101C may be configured to emit respective corresponding signals 118A-118C that may travel along propagation paths 103A-103C, respectively. A coordinate system 104 may be defined in relation to the second vehicle 100B. The coordinate system 104 may have a center coordinate 104A located in proximity to the signal sources 101A-101C, such as, for example, vertically beneath the signal source 101B. However, in other embodiments, the coordinate system 104 may be centered at any spatial position in relative proximity to the signal sources 101A-101C associated with the vehicle 100B.

The signal sensor 102 associated with the vehicle 100A may be configured to detect the signals 118A-118C received from the signal sources 101A-101C, respectively. In accordance with one or more embodiments of the disclosure, the signal sources 101A-101C may each be any device capable of emitting radiation at any suitable wavelength, intensity, and coherence. Radiation emitted by the signal sources 101A-101C may be monochromatic or polychromatic and may be in the ultraviolet (UV), near-ultraviolet (near-UV), infrared (IR), or visible range. For example, in one or more embodiments of the disclosure, the signal sources 101A-101C may each be light-emitting diodes (LEDs) that emit radiation in the UV, near-UV, IR, or visible wavelength range.

In those embodiments in which the signal sources 101A-101C are LEDs, each LED may be electrically controlled to generate a pulsed signal. For example, referring to FIG. 1C, a signal generator 116 may be provided in connection with the vehicle 100B that electrically controls the signal sources 101A-101C to synchronously emit the pulsed signals 118A-118C (e.g., the signal sources may turn on and off synchronously).

As previously described, each of the signal sources 101A-101C may transmit a respective corresponding signal 118A-118C (e.g., ranging waveform). The signals 118A-118C transmitted by the signal sources 101A-101C may travel along the propagation paths 103A, 103B and 103C, respectively. The signals 118A-118C may be modulated using any appropriate analog or digital modulation technique including, but not limited to, amplitude modulation (AM) such as, for example, amplitude-shift keying (ASK) modulation; phase modulation such as, for example, one or more forms of phase-shift keying (PSK); frequency modulation such as, for example, one or more forms of frequency-shift keying (FSK); quadrature amplitude modulation (QAM); or any other modulation technique. In certain embodiments of the disclosure, one or more sub-carrier signals may be added to each of the signals 118A-118C, and the sub-carrier signal(s) may be phase modulated or frequency modulated. In addition, the sub-carrier signal(s) may be modulated with orthogonal frequency-division multiplexing (OFDM). As a non-limiting example, the signal sources 101A-101C may each represent LEDs that are pulsed to generate high frequency ON and OFF keyed waveforms. On-off keying (OOK) is a form of ASK modulation that represents digital data as the presence or absence of a carrier wave.

The signals 118A-118C may each be modulated with different OOK frequencies which may be known to the signal detecting unit 108. Alternatively, in one or more embodiments of the disclosure, each of the signal sources 101A-101C may emit respective corresponding signals 118A-118C having a same OOK frequency. The signals 118A-118C may each be modulated with a frequency in a range of about 20 MHz to about 70 MHz. However, other frequencies are also within the scope of the disclosure. Generally, the signals 118A-118C are modulated at a frequency that is high enough to permit a positioning technique to be used to analyze the signals, but not so high as to cause phase aliasing. If a time of flight of the signals 118A-118C exceeds half of the period of the signals, phase aliasing may occur.

The signal detecting unit 108 may detect the signals 118A-118C respectively emitted from the signal sources 101A-101C. Because the propagation paths along which the signals 118A-118C respectively travel may vary in length, the signals 118A-118C emitted by the signal sources 101A-101C may reach the signal sensor 102 at different times. The phase difference detector 111 may be configured to determine a phase shift between each pair of the signals 118A-118C received by the signal sensor 102. Specifically, the phase difference detector 111 may be configured to process the signals 118A-118C in the frequency domain. That is, the phase difference detector 111 may be configured to measure the phase shift of each of the signals 118A-118C with respect to each other signal. For example, referring to FIG. 1E, the phase shift $\phi_1$ between the signal 118A and the signal 118B, the phase shift $\phi_2$ between the signal 118B and the signal 118C, and the phase shift $\phi_3$ between the signal 118A and the signal 118C may be measured by the phase difference detector 111.

The phase shift or phase difference, in radians, between two signals may be given by $2*\pi*f*\tau$, where f represents a frequency of the signals and $\tau$ represents a time delay difference in receipt of the signals at a signal sensor due to different propagation paths taken by the signals. The phase shifts $\phi_1$, φ₂, φ₃ between each pair of the signals 118A-118C may be measured by the phase difference detector 111 and may be communicated to the one or more processors 109 of the signal detecting unit 108, which may be configured to determine, using the above relationship, a set of time values based on the measured phase shifts. The set of time values may represent a time delay difference between each pair of received signals 118A-118C. For example, the set of time values may include values $\tau_1$, $\tau_2$, and $\tau_3$, representing a difference in a time of receipt or detection at the signal sensor 102 of the signals 118A and 118B, the signals 118B and 118C, and the signals 118A and 118C, respectively.

For a sufficient signal-to-noise ratio (SNR), the phase difference detector 111 may be capable of measuring a few degrees of phase shift corresponding to about 150 ps of delay. Determining the phase shift between signals to this degree of accuracy may require an SNR of about 40 dB and a detection bandwidth of about 100 Hz. The SNR present at the signal sensor 102 may be influenced by various factors including, but not limited to, the power of transmission of the signals 118A-118C, a size of a lens of the signal sensor 102, or the digital signal processor detection bandwidth.

The signal sensor 102 may be a starring array that is capable of spatially separating the signals 118A-118C received from the signal sources 101A-101C in order for the phase difference detector 111 to determine phase shifts between the signals 118A-118C. Referring to FIG. 1E, the signal sensor 102 may be a non-imaging sensor array comprising an optical lens 117. The signals 118A-118C may converge on one side of the lens 117 and be spatially separated on an opposing side of the lens. The signal sensor 102 may further comprise pixel sensors 119A-119C, where each pixel sensor detects a respective corresponding signal of the signals 118A-118C. The phase difference detector 111 may measure the phase shift between the signals 118A-118C received at pixel sensors 119A-119C.

It should be noted that the signal sensor 102 may also be an imaging sensor array having a suitable pixel density. Further, the signal sensor 102 may be a scanning array that has a sufficiently high frame rate capable of sampling the frequencies of the signals 118A-118C such that the phase shifts between the signals may be determined at receipt by the signal sensor 102.

As will be described in more detail hereinafter, the one or more processors 109 may be configured to generate a set of distance expressions. Each distance expression may represent a distance between one of the signal sources 101A-101C and the signal sensor 102. The one or more processors 109 may be further configured to determine a set of distance equations based on the set of distance expressions and the set of time values. Additionally, the one or more processors 109 may be further configured to solve the set of distance equations to determine a position of the first vehicle 100A (e.g., a position of the signal sensor 102) within the coordinate system 104 defined in relation to the second vehicle 100B, or more specifically, in relation to the signal sources 101A-101C.

In one or more embodiments of the disclosure, the determined position may be utilized to facilitate cooperative driving, collision avoidance, and/or collision warning functionalities. As a non-limiting example, the one or more processors 109 may output the determined position to the one or more vehicle control units 112, which may, in turn, control the one or more vehicle components 114 to alter a velocity or an acceleration of the vehicle 100A, to initiate collision avoidance or collision safety measures, or to provide a warning indication to a user of the vehicle 100A or to a user of the vehicle 100B. As another non-limiting example, the one or more processors 109 may output the determined position to the one or more input/output control units 113, which, in turn, may control a user interface 115 to provide a user (e.g., driver) of the vehicle 100A with an indication of the determined position and one or more potential warning indications. The user interface 115 may also provide the user of the vehicle 100A with functionality that allows the user to control the one or more vehicle components 114 via the one or more vehicle control units 112 based on the determined position.

Three signal sources 101A-101C and one signal sensor 102 are shown in the embodiment depicted in FIG. 1A. However, numerous other configurations are within the scope of the disclosure. The vehicle 100B may have any number of signal sources associated therewith. Similarly, the vehicle 100A may have any number of signal sensors associated therewith. As a non-limiting example, in certain embodiments, the vehicle 100B may include one or more additional groups of three signal sources, and the vehicle 100A may include additional signal sensor(s) such that each group of three signal sources transmits respective signals to each signal sensor. As such, various configurations are within the scope of the disclosure that provide for determining multiple positions of a vehicle in relation to another vehicle, which may be used, for example, to determine angular deviations or displacements between vehicles. Further, although the signal sources 101A-101C are depicted as being positioned at a front of the vehicle, other configurations are within the scope of the disclosure. For example, additional signal sources may be positioned at the front, sides, roof, or rear of the vehicle 100B. Similarly, additional signal sensor(s) may be positioned at the front, roof, sides, or rear of the vehicle 100A.

Figure 1B:
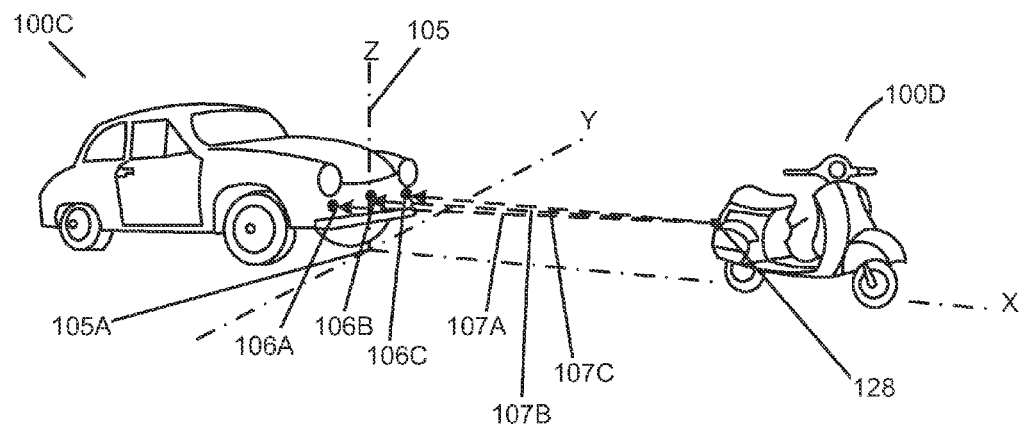
FIG. 1B is a schematic representation of an interaction between vehicles employing a system in accordance with an alternate embodiment of the disclosure.
Figure 1C:
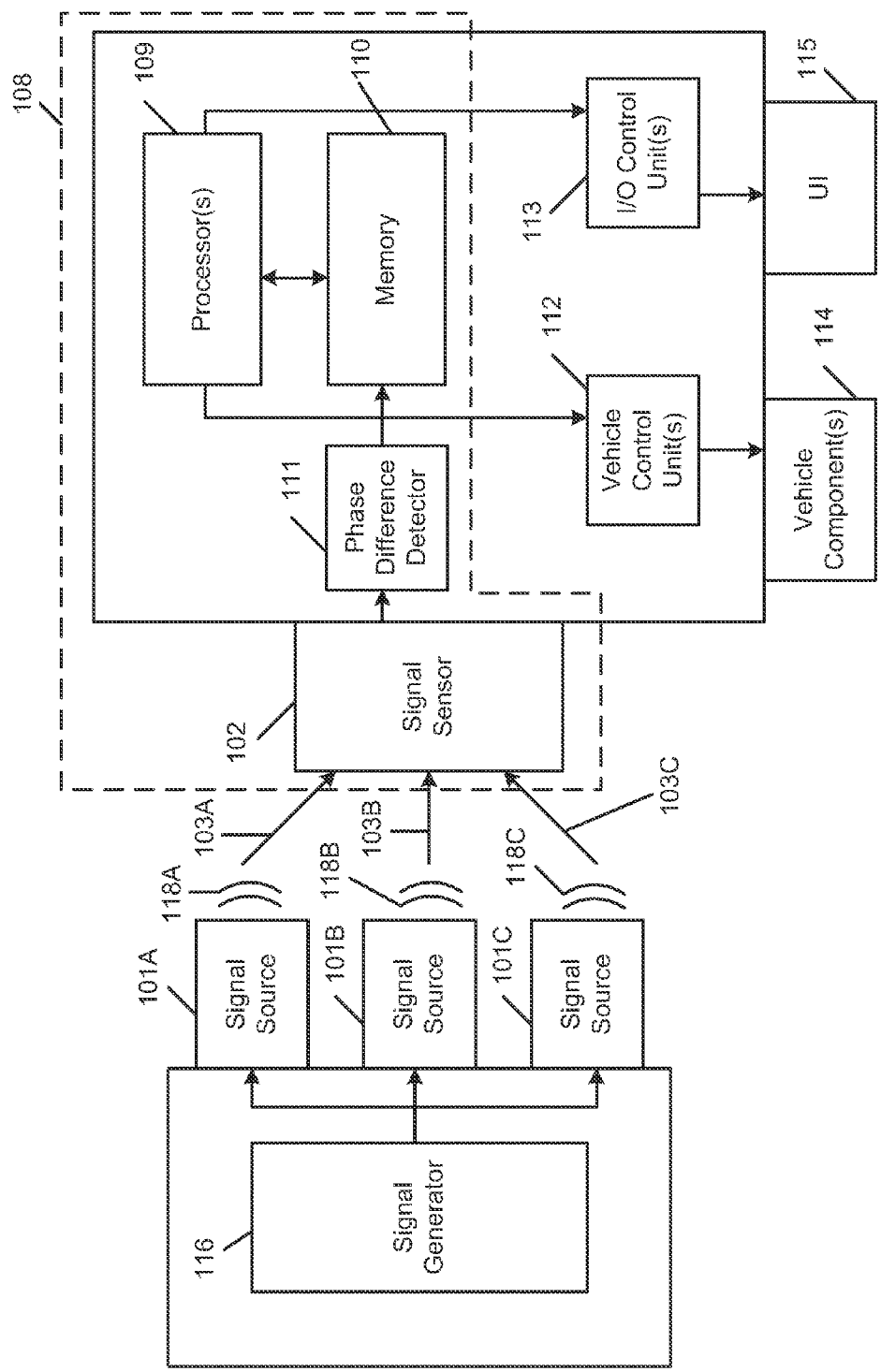
FIG. 1C is a block diagram that schematically depicts components of a system in accordance with the embodiment of the disclosure depicted in FIG. 1A.
Figure 1D:
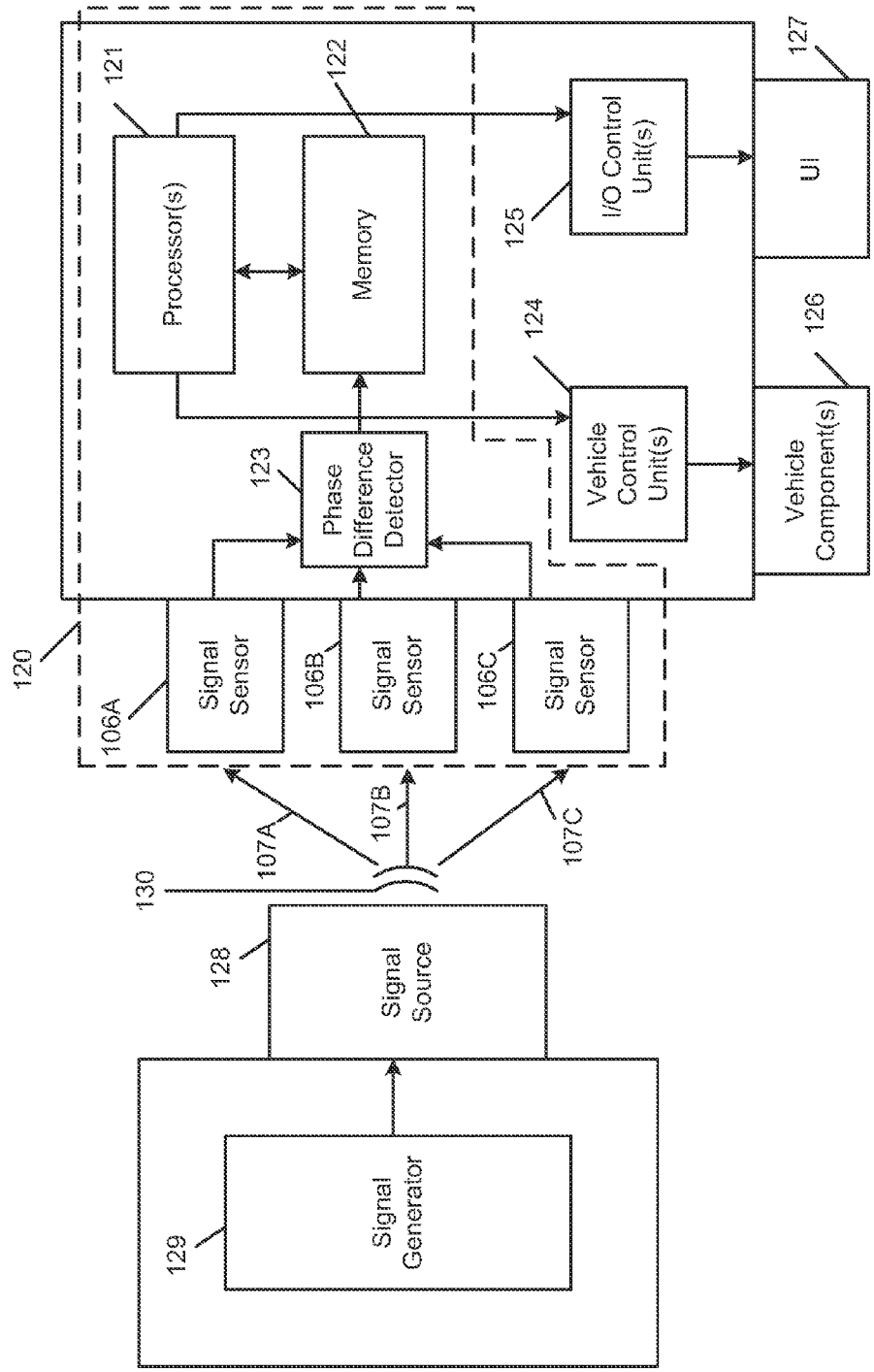
FIG. 1D is a block diagram that schematically depicts components of a system in accordance with the embodiment of the disclosure depicted in FIG. 1B.
Figure 1E:
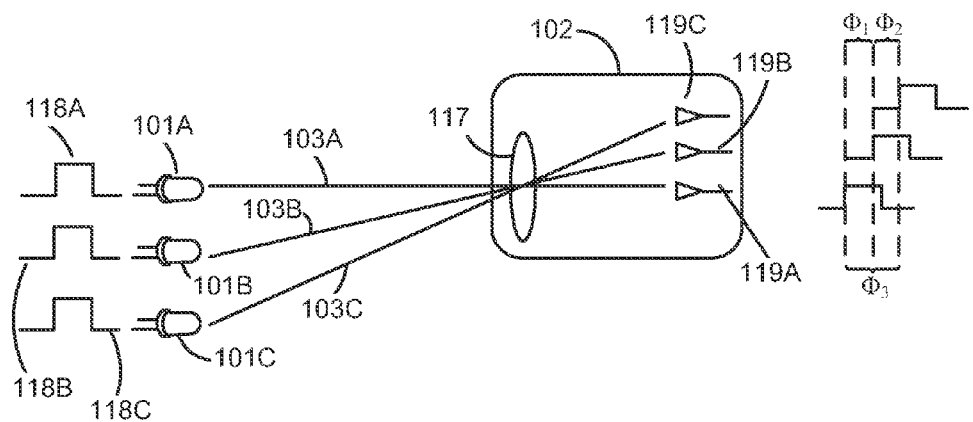
FIG. 1E is a schematic depiction of the transmission and receipt of signals in accordance with the embodiment of the disclosure depicted in FIGS. 1A and 1C.

FIG. 1B depicts an interaction between two vehicles in accordance with one or more alternate embodiments of the disclosure. FIG. 1B schematically depicts a first vehicle 100C having three signal sensors 106A-106C associated therewith. Referring to FIG. 1D, the signal sensors 106A-106C may form at least part of a signal detecting unit 120 associated with the first vehicle 100C. A coordinate system 105 may be defined in relation to the first vehicle 100C. The coordinate system 105 may have a center coordinate 105A located in proximity to the signal sensors 106A-106C, such as, for example, vertically beneath the signal sensor 106B. However, numerous other configurations are within the scope of the disclosure. The coordinate system 105 may be centered at any spatial position within relative proximity of the signal sensors 106A-106C. A signal source 128 may be associated with a second vehicle 100D. The signal source 128 may emit a signal 130 that travels along propagation paths 107A-107C.

The signal detecting unit 120 associated with the vehicle 100C may be configured to detect the signal 130 received from the signal source 128. As previously described in connection with the embodiment of the disclosure depicted in FIG. 1A, the signal source 128 may be any device capable of emitting radiation at any suitable wavelength, intensity, and coherence. That is, radiation emitted by the signal source 128 may be monochromatic or polychromatic and may be in the UV, near-UV, IR, or visible range. For example, in one or more embodiments of the disclosure, the signal source 128 may be an LED that emits radiation in the UV, near-UV, IR, or visible wavelength range. The signal source 128 may be electrically controlled to generate a pulsed signal. For example, referring to FIG. 1D, a signal generator 129 may be provided in connection with the vehicle 100D that electrically controls the signal source 128 to emit the pulsed signal 130. If more than one signal source 128 is provided, the signal source(s) may be configured to turn on and off synchronously.

The signal 130 emitted by the signal source 128 may be modulated using any appropriate analog or digital modulation technique including, but not limited to, amplitude modulation (AM) such as, for example, amplitude-shift keying (ASK) modulation; phase modulation such as, for example, one or more forms of phase-shift keying (PSK); frequency modulation such as, for example, one or more forms of frequency-shift keying (FSK); quadrature amplitude modulation (QAM); or any other modulation technique. In certain embodiments of the disclosure, one or more sub-carrier signals may be added to the signal 130, and the sub-carrier signal(s) may be phase modulated or frequency modulated. In addition, the sub-carrier signal(s) may be modulated with orthogonal frequency-division multiplexing (OFDM). As a non-limiting example, the signal source 128 may be an LED that is pulsed to generate high frequency ON and OFF keyed waveforms. On-off keying (OOK) is a form of ASK modulation that represents digital data as the presence or absence of a carrier wave.

In one or more embodiments of the disclosure, different OOK frequencies may be modulated onto the emitted signal 130. In one or more alternative embodiments of the disclosure, the signal 130 emitted by the signal source 128 may have a single OOK frequency.

The signal detecting unit 120 may further comprise one or more processors 121, a memory 122 operatively coupled to the one or more processors 121, and a phase difference detector 123 operatively coupled to the memory 122. The first vehicle 100C may further comprise one or more vehicle control units 124 and one or more input/output control units 125 configured to be controlled by the one or more processors 121. The one or more vehicle control units 124 may be configured to control operations of one or more vehicle components 126. The one or more input/output control units 125 may be configured to control a user interface (UI) 127.

The signal 130 emitted by the signal source 128 may travel along propagation paths 107A-107C, respectively. Because each propagation path may vary in length, the signal 130 may reach the signal sensors 106A-106C of the signal detecting unit 120 at different times. The phase difference detector 123 of the signal detecting unit 120 may be configured to determine a phase shift or phase difference between the signal at receipt or detection of the signal 130 by each of the signal sensors 106A-106C. The measured phase shifts may be communicated to the one or more processors 121 of the signal detecting unit 120, which may be configured to determine a set of time values based on the measured phase shifts.

The signal 130 may be modulated with a frequency in a range of about 20 MHz to about 70 MHz. However, other frequencies are also within the scope of the disclosure. Generally, the signal 130 may be modulated at a frequency that is high enough to permit positioning techniques to be used to analyze the signal at a time of receipt by the signal sensors 106A-106C, but not so high as to create phase aliasing. If a time of flight of the signal 130 along propagation paths 107A-107C exceeds half of the period of the signal, phase aliasing may occur.

Figure 1F:
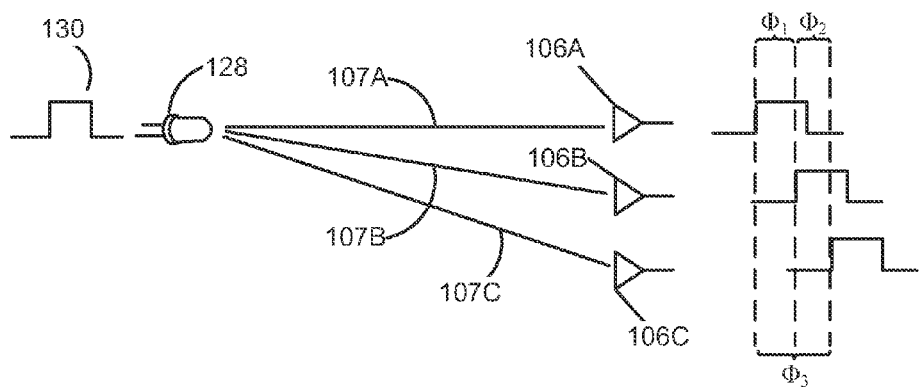
FIG. 1F is a schematic depiction of the transmission and receipt of a signal in accordance with the embodiment of the disclosure depicted in FIGS. 1B and 1D.

Similar to the embodiment of the disclosure depicted in FIG. 1A, the signal detecting unit 120 may detect the signal 130 emitted from the signal source 128. Because the signal 130 travels along propagation paths 107A-107C that may vary in length, the signal 130 may reach each of the signal sensors 106A-106C at different times. The phase difference detector 123 may be configured to determine phase shifts between the signals 130 received at signal sensors 106A-106C. Specifically, the phase difference detector 123 may be configured to process the received signals 130 in the frequency domain. That is, the phase difference detector 123 may be configured to measure the phase shift of the signal 130 received at each of the signal sensors 106A-106C with respect to the signal 130 received at each of the other signal sensors 106A-106C. For example, referring to FIG. 1F, the phase shift $\phi_1$ between the signal 130 received at the signal sensor 106A and the signal 130 received at the signal sensor 106B, the phase shift $\phi_2$ between the signal 130 received at the signal sensor 106B and the signal 130 received at the signal sensor 106C, and the phase shift $\phi_3$ between the signal 130 received at the signal sensor 106A and the signal 130 received at the signal sensor 106C may be measured by the phase difference detector 123 in a manner similar to that previously described with respect to the embodiment depicted in FIG. 1A.

The measured phase shifts $\phi_1$, $\phi_2$, $\phi_3$ may be communicated by the phase difference detector 123 via the memory 122 to the one or more processors 121 of the signal detecting unit 120, which may be configured to determine a set of time values based on the measured phase shifts. Each value in the set of time values may represent a time delay difference between receipt of the signal 130 at one of the signal sensors 106A-106C and receipt of the signal 130 at one of the other signal sensors 106A-106C. For example, the set of time values may include values $\tau_1$, $\tau_2$, and $\tau_3$, representing a difference in a time of receipt or detection of the signal 130 at the signal sensors 106A and 106B, at the signal sensors 106B and 106C, and at the signal sensors 106A and 106C, respectively.

The one or more processors 121 may be configured to generate a set of distance expressions. Each distance expression may represent a distance between the signal source 128 and one of the signal sensors 106A-106C. The one or more processors 121 may be further configured to determine a set of distance equations based on the set of distance expressions and the set of time values. Additionally, the one or more processors 121 may be further configured to solve the set of distance equations to determine a position associated with the second vehicle 100D (e.g., a position of the signal source 128) within the coordinate system 105 defined in relation to the first vehicle 100C, or more specifically, in relation to the signal sensors 106A-106C.

In one or more embodiments of the disclosure, the determined position may be utilized to facilitate cooperative driving, collision avoidance, and/or collision warning functionalities. As a non-limiting example, the one or more processors 121 may output the determined position to the one or more vehicle control units 124, which may, in turn, control the one or more vehicle components 126 to alter a velocity or an acceleration of the vehicle 100C, to initiate collision avoidance or collision safety measures, or to provide a warning indication to a user of the vehicle 100C or to a user of the vehicle 100D. As another non-limiting example, the one or more processors 121 may output the determined position to the one or more input/output control units 125, which, in turn, may control a user interface 127 to provide a user (e.g., driver) of the vehicle 100C with an indication of the determined position and one or more potential warning indications. The user interface 127 may also provide the user of the vehicle 100C with functionality that allows the user to control the one or more vehicle components 126 via the one or more vehicle control units 124 based on the determined position.

The signal sensors 106A-106C may each be any photo-sensing or photodetecting device known in the art including, but not limited to, photodiodes, optical detectors, LEDs that are reversed-biased to act as photodiodes, phototransistors, photoresistors, phototubes, photovoltaic cells, quantum dot photoconductors, charge-coupled devices (CCD), or active pixel sensors. The foregoing list is not intended as an exhaustive list, and any suitable signal sensors now known in the art or which may be developed in the future may be used.

Three signal sensors 106A-106C and one signal source 128 are shown in the embodiment of the disclosure depicted in FIG. 1B. However, numerous other configurations are within the scope of the disclosure. The vehicle 100D may have any number of signal sources associated therewith. Similarly, the vehicle 100C may have any number of signal sensors associated therewith. As a non-limiting example, in certain embodiments, the vehicle 100D may include one or more additional signal sources, and the vehicle 100C may include additional groups of three signal sensors such that each group of three signal sensors receives a transmitted signal from each signal source. In such a manner, multiple relative positions between the vehicles 100C and 100D may be determined, which may, in turn, be used to determine angular deviations or displacements between the vehicles 100C and 100D. Further, although the signal source 128 is depicted as being positioned at the rear of the vehicle 100D, other configurations are within the scope of the disclosure. For example, additional signal sources may be positioned at the front, sides, roof, or rear of the vehicle 100D. Similarly, although the signal sensors 106A-106C are depicted as being positioned at the front of the vehicle 100C, additional signal sensor(s) may be positioned at the front, roof, sides, or rear of the vehicle 100C.

In one or more embodiments of the disclosure, a packet structure may be employed to convey information to a signal detecting unit, where the information relates to a respective corresponding signal source. The discussion below is applicable to one or more embodiments of the disclosure, and thus will be presented in general terms without reference to any specific embodiment. A representative packet structure is depicted below:

| Synchronization | Vehicle ID | <x,y,z> | --- OOK Ranging Waveform --- |

Referring to the packet structure depicted above, the synchronization field may be used to obtain bit synchronization; the vehicle ID field may comprise an identifier that uniquely identifies the vehicle with which the signal source is associated; and the <x, y, z> field may comprise a spatial coordinate associated with the signal source which, as described earlier, may be a spatial coordinate within a coordinate system defined in relation to a vehicle. The remaining field depicted in the packet structure above may refer to the signal emitted from the signal source. Although the signal is referred to as an OOK Ranging Waveform, the signal may be modulated according to any of the modulation schemes previously described. In one or more embodiments of the disclosure, the synchronization field, the vehicle ID field, and the signal source spatial coordinate field may be transmitted via modulation of the signal emitted from the signal source. As a non-limiting example, the signal emitted from a signal source may be frequency modulated using any appropriate modulation scheme (e.g., frequency-shift on and off keying (OOK), Manchester encoding, and so forth) to convey digital data relating to the other non-ranging fields.

Embodiments of the disclosure provide several advantages over conventional systems. For example, embodiments of the disclosure relate to positioning systems and techniques for determining relative positioning information between vehicles that provide the accuracy of LIDAR, for example, at the relatively inexpensive costs associated with SONAR, for example. Further, ranging technologies such as LIDAR, RADAR and SONAR are incapable of determining positioning information between objects in accordance with embodiments of the disclosure. LIDAR, for example, is only capable of determining range information; spatial or angular relationships must be determined indirectly based on the directionality of the laser.

Any of the signal sources 101A-101C of the embodiment depicted in FIG. 1A or the signal source 128 of the embodiment depicted in FIG. 1B may be provided as part of signaling lights of the vehicles 100B and 100D, respectively. More specifically, the signal sources 101A-101C or the signal source 128 may each be LEDs that are provided as part of one or more vehicle signaling lights. The one or more signaling lights may be any suitable signaling lights including, but not limited to, tail lights, brake lights, reverse lights, headlights, side lights, mirror lights, fog lamps, low beams, high beams, add-on lights, or combinations thereof. Alternatively, the signal sources 101A-101C may be positioned on the vehicle 100B or the signal source 128 may be positioned on the vehicle 100D independent of any signaling lights and may be configured to emit non-visible radiation such that a vehicle operator does not confuse the emitted radiation with other indications provided by the signaling lights.

The signal sources 101A-101C or the signal source 128 may include, but are not limited to, LEDs, incandescent lamps, halogen lamps, fluorescent lamps, compact fluorescent lamps, gas discharge lamps, light amplification by stimulated emission of radiation (lasers), diode lasers, gas lasers, solid state lasers, or combinations thereof.

The one or more processors 109 or the one or more processors 121 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The one or more processors 109 or the one or more processors 121 may be from a family of Intel® processors, such as the Intel® Atom® processor family. The one or more processors 109 or the one or more processors 121 may also include one or more application-specific integrated circuits (ASICs) or application-specific standard products (ASSPs) for handling specific data processing functions or tasks.

In certain embodiments, the one or more processors 109 or the one or more processors 121 may be a part of a general vehicle main computer system. The main computer system may, in various embodiments of the disclosure, manage various aspects of the operation of the vehicle, such as engine control, transmission control, and various component controls. In other embodiments, the signal detecting unit 108 or the signal detecting unit 120 may be separate and stand-alone systems that control inter-vehicle communications. Additionally, in certain embodiments, the signal detecting unit 108 or the signal detecting unit 120 may be integrated into the vehicle, while in other embodiments, may be added to the vehicle following production and/or initial configuration of the vehicle.

The memory 110 or 122 may include one or more volatile and/or non-volatile memory devices including, but not limited to, magnetic storage devices, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read-only memory (EEPROM), non-volatile RAM (NVRAM), universal serial bus (USB) removable memory, or combinations thereof.

The user interface 115 or the user interface 127 may be any known input device, output device, or input and output device that can be used by a user to communicate with the one or more processors 109 or the one or more processors 121, and may include, but are not limited to, a touch panel, a keyboard, a display, a speaker, a switch, a visual indicator, an audio indicator, a tactile indicator, a speech to text engine, or combinations thereof. In one or more embodiments of the disclosure, the user interface 115 or the user interface 127 may be used by a user, such as a driver of the vehicle 100A or a driver of the vehicle 100C, to selectively activate or deactivate the signal detecting unit 108 or the signal detecting unit 120, respectively. In other embodiments of the disclosure, the user interface 115 or the user interface 127 may be employed to control the one or more processors 109 or the one or more processors 121 to provide one or more control signals to the one or more vehicle control units 112 or the one or more vehicle control units 124, respectively, to control the one or more components 114 of the vehicle 100A or the one or more components 126 of the vehicle 100C. The one or more vehicle components 114 or the one or more vehicle components 126 may include, but are not limited to, brakes, an engine, a transmission, a fuel supply, a throttle valve, a clutch, or any combination thereof.

Figure 2:
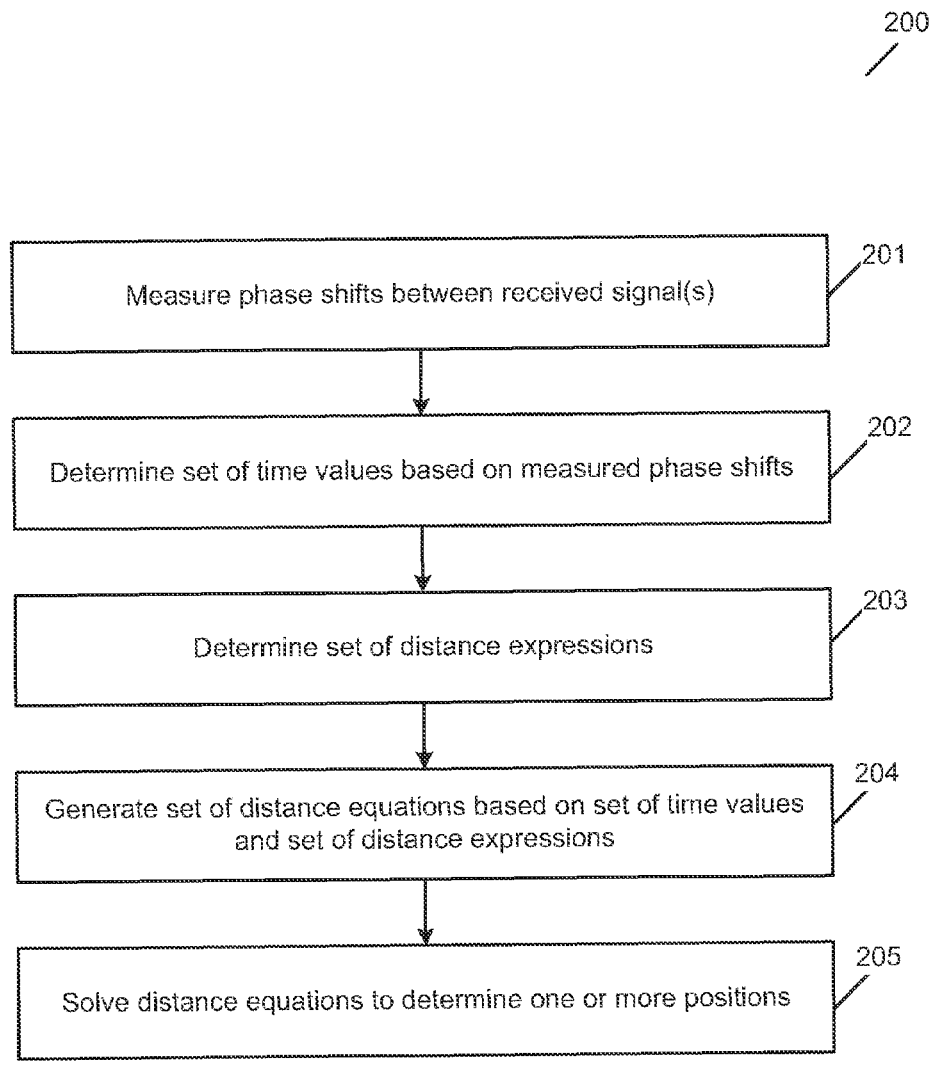
FIG. 2 is a flow diagram illustrating an exemplary method for determining range information between vehicles in accordance with one or more embodiments of the disclosure.

FIG. 2 depicts an exemplary method for determining position information between vehicles using a Time Difference of Arrival (TDOA) technique. The TDOA technique will be described through reference to the embodiment depicted in FIG. 1A in which the signal sensor 102 associated with the vehicle 100A receives three signals 118A-118C from the respective corresponding three signal sources 101A-101C associated with the vehicle 100B. However, it should be appreciated that methods according to embodiments of the disclosure are applicable to any configuration of signal sensor(s) and signal source(s) including, but not limited to, the embodiment of the disclosure depicted in FIG. 1B.

Referring to FIG. 2, at block 201, the phase difference detector 111 measures phase shifts $\phi_1$, $\phi_2$, $\phi_3$ between the signal 118A and the signal 118B, between the signal 118B and the signal 118C, and between the signal 118A and the signal 118C, respectively. The phase difference detector 111 communicates the measured phase shifts to the one or more processors 109 of the signal detecting unit 108, which may be configured to determine a set of time values based on the measured phase shifts. As previously described, the set of time values may represent a time delay difference between each pair of received signals 118A-118C.

At block 203, the one or more processors 109 may be configured to execute one or more computer program instructions stored, for example, in the memory 110 to generate a set of distance expressions, where each distance expression represents a distance between one of the signal sources 101A-101C and the signal sensor 102 within the coordinate system 104. For example, the set of distance expressions may comprise an algebraic representation of a distance between the signal source 101A and the signal sensor 102, a distance between the signal source 101B and the signal sensor 102, and a distance between the signal source 101C and the signal sensor 102.

At block 204, the one or more processors 109 may be further configured to execute one or more computer program instructions stored, for example, in the memory 110 to generate a set of distance equations based on the set of distance expressions and the set of time values. Each distance equation may represent a difference between one distance expression and one other distance expression and may be equivalent to a time delay between receipt of one of the signals 118A-118C and one of the other signals 118A-118C (e.g., $\tau_1$, $\tau_2$, or $\tau_3$) multiplied by a velocity of the signals 118A-118C.

At block 205, the one or more processors 109 may be configured to execute one or more computer program instructions stored, for example, in the memory 110 to solve the set of distance equations to determine one or more positions of the first vehicle 100A in relation to the coordinate system 104 defined with respect to the second vehicle 100B. More specifically, the one or more processors 109 may be configured to solve the set of distance equations using a TDOA hyperbolic positioning technique.

An exemplary algebraic derivation according to one or more embodiments of the disclosure will now be described in more detail. The exemplary derivation is presented in the context of the embodiment of the disclosure depicted in FIG. 1A. However, one of ordinary skill in the art will recognize that the technique described below is applicable to any embodiment of the disclosure and that other techniques for determining positions between vehicles having one or more signal sources and one or more signal sensors associated therewith are within the scope of the disclosure.

Let $A_i$, $A_j$, and $A_k$ represent the three signal sources 101A-101C, respectively. $A_i$, $A_j$, and $A_k$ may be assigned spatial coordinates $<x_i, y_i, z_i>$, $<x_j, y_j, z_j>$, and $<x_k, y_k, z_k>$, respectively, with respect to the coordinate plane 104. Further, Let $A_t$ represent the signal sensor 102. The signal sensor $A_t$ may be assigned a spatial coordinate $<x_t, y_t, z_t>$ with respect to the coordinate system 104. According to embodiments of the disclosure, a starting point for a TDOA technique for determining one or more distances between vehicles (e.g., vehicle 100A and vehicle 100B) is the equation for the distance between two points.

$$R = \sqrt{(x_i - x_t)^2 + (y_i - y_t)^2 + (z_i - z_t)^2} \qquad \text{Eq. 1}$$

The distance between an emitting source and a receiving sink may be determined indirectly by determining a time of arrival (TOA) of a signal received by the receiving sink from the emitting source. Multiplying the TOA t by the signal velocity c (e.g., the speed of light in air) yields a distance of travel R. Equation 1 may be expanded to three distance expressions based upon vector coordinates associated with the signal sources $A_i$, $A_j$, and $A_k$ and the vector coordinate associated with the signal sensor $A_t$.

$$ct_i = R_i = \sqrt{(x_i - x_t)^2 + (y_i - y_t)^2 + (z_i - z_t)^2} \qquad \text{Eq. 2}$$

$$ct_j = R_j = \sqrt{(x_j - x_t)^2 + (y_j - y_t)^2 + (z_j - z_t)^2} \qquad \text{Eq. 3}$$

$$ct_k = R_k = \sqrt{(x_k - x_t)^2 + (y_k - y_t)^2 + (z_k - z_t)^2} \qquad \text{Eq. 4}$$

Figure 3:
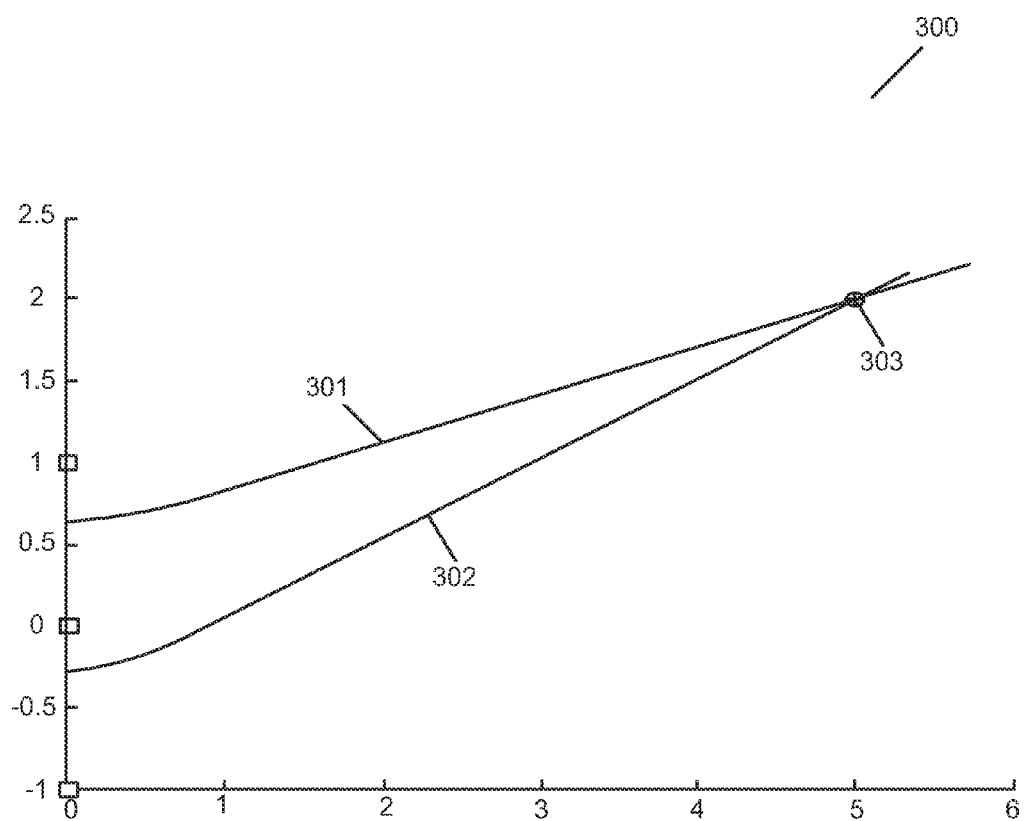
FIG. 3 is an exemplary graph illustrating a positioning technique in accordance with one or more embodiments of the disclosure.

For the purposes of this exemplary derivation, distances along the z-axis of the coordinate system 104 are assumed to be known. As such, referring to FIG. 3, the following derivation yields a system 300 of two equations with each equation describing a respective hyperbolic function 301, 302. An intersection 303 of the two hyperbolic functions 301, 302 represents a position of $A_t$ (e.g., the signal sensor 102) with respect to the signal sources $A_i$, $A_j$, and $A_k$, or more specifically, within the coordinate system 104.

Equations 2, 3, and 4 may be used to generate distance equations corresponding to the distance differences $R_{ji}$, $R_{ki}$, and $R_{kj}$, where:

$$R_j - R_i = R_{ji} = c(t_j - t_i) = \sqrt{(x_j - x_t)^2 + (y_j - y_t)^2 + (z_j - z_t)^2} - \sqrt{(x_i - x_t)^2 + (y_i - y_t)^2 + (z_i - z_t)^2} \qquad \text{Eq. 5}$$

$$R_k - R_i = R_{ki} = c(t_k - t_i) = \sqrt{(x_k - x_t)^2 + (y_k - y_t)^2 + (z_k - z_t)^2} - \sqrt{(x_i - x_t)^2 + (y_i - y_t)^2 + (z_i - z_t)^2} \qquad \text{Eq. 6}$$

$$R_k - R_j = R_{kj} = c(t_k - t_j) = \sqrt{(x_k - x_t)^2 + (y_k - y_t)^2 + (z_k - z_t)^2} - \sqrt{(x_j - x_t)^2 + (y_j - y_t)^2 + (z_j - z_t)^2} \qquad \text{Eq. 7}$$

As the distance differences $R_{ji}$, $R_{ki}$, and $R_{kj}$ are each equivalent to the time delay between the receipt or detection, at the signal sensor 102, of one of the signals 118A, 118B, or 118C and one of the other signals 118A, 118B, or 118C multiplied by the velocity of the signals 118A-118C, the values of the distance differences $R_{ji}$, $R_{ki}$, and $R_{kj}$ may be determined based on the set of time values determined at block 202 (FIG. 2), which, in turn, may be determined based on the phase shifts between the signals measured at block 201.

As previously discussed, for the purposes of the positioning technique detailed below, distances between the vehicles along the z axis are assumed to be known constants. However, one of ordinary skill in the art will appreciate that embodiments in which the distances along the z-axis are not known constants are also within the scope of the disclosure, and that this exemplary derivation may be extended to encompass such embodiments.

Assuming that distance differences along the z-axis are known constants, those distance differences may be replaced with algebraic symbols that represent constants as shown below in Equation 8.

$$z_{ji}=(z_j-z_t),\ z_{it}=(z_i-z_t)\ \text{and}\ z_{kt}=(z_k-z_t). \qquad \text{Eq. 8}$$

Substituting in the constants provided by Equation 8 and moving one square root term to the other side for each of Equations 5, 6, and 7 yields:

$$R_{ji}+\sqrt{(x_i-x_t)^2+(y_i-y_t)^2+z_{it}^2}=\sqrt{(x_j-x_t)^2+(y_j-y_t)^2+z_{jt}^2} \qquad \text{Eq. 9}$$

$$R_{ki}+\sqrt{(x_i-x_t)^2+(y_i-y_t)^2+z_{it}^2}=\sqrt{(x_k-x_t)^2+(y_k-y_t)^2+z_{kt}^2} \qquad \text{Eq. 10}$$

$$R_{kj}+\sqrt{(x_j-x_t)^2+(y_j-y_t)^2+z_{jt}^2}=\sqrt{(x_k-x_t)^2+(y_k-y_t)^2+z_{kt}^2} \qquad \text{Eq. 11}$$

Squaring both sides of each of Equations 9, 10, and 11 produces the following set of equations:

$$R_{ji}^2+2R_{ji}\sqrt{(x_i-x_t)^2+(y_i-y_t)^2+z_{it}^2}+(x_i-x_t)^2+(y_i-y_t)^2+z_{it}^2=(x_j-x_t)^2+(y_j-y_t)^2+z_{jt}^2 \qquad \text{Eq. 12}$$

$$R_{ki}^2+2R_{ki}\sqrt{(x_i-x_t)^2+(y_i-y_t)^2+z_{it}^2}+(x_i-x_t)^2+(y_i-y_t)^2+z_{it}^2=(x_k-x_t)^2+(y_k-y_t)^2+z_{kt}^2 \qquad \text{Eq. 13}$$

$$R_{kj}^2+2R_{kj}\sqrt{(x_j-x_t)^2+(y_j-y_t)^2+z_{jt}^2}+(x_j-x_t)^2+(y_j-y_t)^2+z_{jt}^2=(x_k-x_t)^2+(y_k-y_t)^2+z_{kt}^2 \qquad \text{Eq. 14}$$

Expanding the remaining squared terms in each of Equations 12, 13, and 14 produces:

$$R_{ji}^2+2R_{ji}\sqrt{(x_i-x_t)^2+(y_i-y_t)^2+z_{it}^2}+x_i^2-2x_ix_t-x_t^2+y_i^2-2y_iy_t-y_t^2+z_{it}^2=x_j^2 2x_jx_t-x_t^2+y_j^2-2y_jy_t-y_t^2+z_{jt}^2 \qquad \text{Eq. 15}$$

$$R_{ki}^2+2R_{ki}\sqrt{(x_i-x_t)^2+(y_i-y_t)^2+z_{it}^2}+x_i^2-2x_ix_t-x_t^2+y_i^2-2y_iy_t-y_t^2+z_{it}^2=x_k^2 2x_kx_t-x_t^2+y_k^2-2y_ky_t-y_t^2+z_{kt}^2 \qquad \text{Eq. 16}$$

$$R_{kj}^2+2R_{kj}\sqrt{(x_j-x_t)^2+(y_j-y_t)^2+z_{jt}^2}+x_j^2-2x_jx_t-x_t^2+y_j^2-2y_jy_t-y_t^2+z_{jt}^2=x_k^2 2x_kx_t-x_t^2+y_k^2-2y_ky_t-y_t^2+z_{kt}^2 \qquad \text{Eq. 17}$$

Eliminating the $x_t^2$ and $y_t^2$ from both sides of each of Equations 15, 16, and 17 reduces the equation set to the following equations:

$$R_{ji}^2+2R_{ji}\sqrt{(x_i-x_t)^2+(y_i-y_t)^2+z_{it}^2}+x_i^2-2x_ix_t+y_i^2-2y_iy_t+z_{it}^2=x_j^2-2x_jx_t+y_j^2-2y_jy_t+z_{jt}^2 \qquad \text{Eq. 18}$$

$$R_{ki}^2+2R_{ki}\sqrt{(x_i-x_t)^2+(y_i-y_t)^2+z_{it}^2}+x_i^2-2x_ix_t+y_i^2-2y_iy_t+z_{it}^2=x_k^2-2x_kx_t+y_k^2-2y_ky_t+z_{kt}^2 \qquad \text{Eq. 19}$$

$$R_{kj}^2+2R_{kj}\sqrt{(x_j-x_t)^2+(y_j-y_t)^2+z_{jt}^2}+x_j^2-2x_jx_t+y_j^2-2y_jy_t+z_{jt}^2=x_k^2-2x_kx_t+y_k^2-2y_ky_t+z_{kt}^2 \qquad \text{Eq. 20}$$

Shifting all but the square root terms to the right side of each of Equations 18, 19, and 20 and combining similar terms yields:

$$\sqrt{(x_i-x_t)^2+(y_i-y_t)^2+z_{it}^2}=\frac{-R_{ji}^2+(x_j^2-x_i^2)+(y_j^2-y_i^2)+(z_{jt}^2-z_{it}^2)+2x(x_i-x_j)+2y(y_i-y_j)}{2R_{ji}} \qquad \text{Eq. 21}$$

$$\sqrt{(x_i-x_t)^2+(y_i-y_t)^2+z_{it}^2}=\frac{-R_{ki}^2+(x_k^2-x_i^2)+(y_k^2-y_i^2)+(z_{kt}^2-z_{it}^2)+2x(x_i-x_k)+2y(y_i-y_k)}{2R_{ki}} \qquad \text{Eq. 22}$$

$$\sqrt{(x_j-x_t)^2+(y_j-y_t)^2+z_{jt}^2}=\frac{-R_{kj}^2+(x_k^2-x_j^2)+(y_k^2-y_j^2)+(z_{kt}^2-z_{jt}^2)+2x(x_j-x_k)+2y(y_j-y_k)}{2R_{kj}} \qquad \text{Eq. 23}$$

Equations 21, 22 and 23 may now be simplified by making the following variable substitutions: $x_{ij}$ for $x_i-x_j$ and $y_{ij}$ for $y_i-y_j$.

$$\sqrt{(x_i-x_t)^2+(y_i-y_t)^2+z_{it}^2}=\frac{-R_{ji}^2+(x_j^2-x_i^2)+(y_j^2-y_i^2)+(z_{jt}^2-z_{it}^2)+2xx_{ij}+2yy_{ij}}{2R_{ji}} \qquad \text{Eq. 24}$$

$$\sqrt{(x_i-x_t)^2+(y_i-y_t)^2+z_{it}^2}=\frac{-R_{ki}^2+(x_k^2-x_i^2)+(y_k^2-y_i^2)+(z_{kt}^2-z_{it}^2)+2xx_{ik}+2yy_{ik}}{2R_{ki}} \qquad \text{Eq. 25}$$

$$\sqrt{(x_j-x_t)^2+(y_j-y_t)^2+z_{jt}^2}=\frac{-R_{kj}^2+(x_k^2-x_j^2)+(y_k^2-y_j^2)+(z_{kt}^2-z_{jt}^2)+2xx_{jk}+2yy_{jk}}{2R_{kj}} \qquad \text{Eq. 26}$$

Through the above-described algebraic manipulations, Equations 5-7 have been transformed into Equations 24-26 that, when squared, represent intersecting hyperboloids. By equating Equation 24 and Equation 25 to form Equation 27, we can derive a plane equation in the form of $y=Ax+C$. Equating Equations 24 and 25 yields:

$$\frac{-R_{ji}^2+(x_j^2-x_i^2)+(y_j^2-y_i^2)+(z_{jt}^2-z_{it}^2)+2x_tx_{ij}+2yy_{ij}}{2R_{ji}}= \\ \frac{-R_{ki}^2+(x_k^2-x_i^2)+(y_k^2-y_i^2)+(z_{kt}^2-z_{it}^2)+2x_tx_{ik}+2yy_{ik}}{2R_{ki}} \qquad \text{Eq. 27}$$

Multiplying both sides of Equation 27 by $R_{ki}$ and separating fractional components yields:

$$\frac{R_{ki}[-R_{ji}^2+(x_j^2-x_i^2)+(y_j^2-y_i^2)+(z_{jt}^2-z_{it}^2)]}{2}+R_{ki}(x_t x_{ij}+y_t y_{ij})= \qquad \text{Eq. 28}$$

$$\frac{R_{ji}[-R_{ki}^2+(x_k^2-x_i^2)+(y_k^2-y_i^2)+(z_{kt}^2-z_{it}^2)]}{2}+R_{ji}(x_t x_{ik}+y_t y_{ik})$$

Moving certain terms between both sides of Equation 28 yields:

$$\frac{R_{ki}[-R_{ji}^2+(x_j^2-x_i^2)+(y_j^2-y_i^2)+(z_{jt}^2-z_{it}^2)]-}{2} \qquad \text{Eq. 29}$$
$$\frac{-R_{ji}[-R_{ki}^2+(x_k^2-x_i^2)+(y_k^2-y_i^2)+(z_{kt}^2-z_{it}^2)]}{2}=$$
$$+R_{ji}(x_t x_{ik}+y_t y_{ik})-R_{ki}(x_t x_{ij}+y_t y_{ij})$$

Rearranging and factoring out certain terms from the left side of Equation 29 yields:

$$x_t(R_{ji}x_{ik}-R_{ki}x_{ij})+y_t(R_{ji}y_{ik}-R_{ki}y_{ij})= \qquad \text{Eq. 30}$$
$$\frac{R_{ki}[-R_{ji}^2+(x_j^2-x_i^2)+(y_j^2-y_i^2)+(z_{jt}^2-z_{it}^2)]-}{2}$$
$$\frac{R_{ji}[-R_{ki}^2+(x_k^2-x_i^2)+(y_k^2-y_i^2)+(z_{kt}^2-z_{it}^2)]}{2}$$

Moving the term $x_t(R_{ji}x_{ik}-R_{ki}x_{ij})$ from the left side of Equation 30 to the right side yields:

$$y_t(R_{ji}y_{ik}-R_{ki}y_{ij})=-x_t(R_{ji}x_{ik}-R_{ki}x_{ij})+ \qquad \text{Eq. 31}$$
$$\frac{R_{ki}[-R_{ji}^2+(x_j^2-x_i^2)+(y_j^2-y_i^2)+(z_{jt}^2-z_{it}^2)]-}{2}$$
$$\frac{R_{ji}[-R_{ki}^2+(x_k^2-x_i^2)+(y_k^2-y_i^2)+(z_{kt}^2-z_{it}^2)]}{2}$$

Dividing both sides of Equation 31 by $(R_{ji}y_{ik}-R_{ki}y_{ij})$ yields:

$$y_t=x_t\frac{(-R_{ji}x_{ik}+R_{ki}x_{ij})}{(R_{ji}y_{ik}-R_{ki}y_{ij})}+ \qquad \text{Eq. 32}$$
$$\frac{R_{ki}[-R_{ji}^2+(x_j^2-x_i^2)+(y_j^2-y_i^2)+(z_{jt}^2-z_{it}^2)]-}{2(R_{ji}y_{ik}-R_{ki}y_{ij})}$$
$$\frac{R_{ji}[-R_{ki}^2+(x_k^2-x_i^2)+(y_k^2-y_i^2)+(z_{kt}^2-z_{it}^2)]}{2(R_{ji}y_{ik}-R_{ki}y_{ij})}$$

Equation 32 is now in the desired form of a general plane equation given by Equation 33 below:

$$y_t = Ax_t + C \qquad \text{Eq. 33}$$
where $$A = \frac{(R_{ki}x_{ij}-R_{ji}x_{ik})}{(R_{ji}y_{ik}-R_{ki}y_{ij})} \qquad \text{Eq. 34}$$
and -continued $$C = \frac{R_{ki}[-R_{ji}^2+(x_j^2-x_i^2)+(y_j^2-y_i^2)+(z_{jt}^2-z_{it}^2)]-}{2(R_{ji}y_{ik}-R_{ki}y_{ij})} \qquad \text{Eq. 35}$$
$$\frac{R_{ji}[-R_{ki}^2+(x_k^2-x_i^2)+(y_k^2-y_i^2)+(z_{kt}^2-z_{it}^2)]}{2(R_{ji}y_{ik}-R_{ki}y_{ij})}$$

Substituting Equation 33 back into Equation 26 yields Equation 36 below.

$$\sqrt{(x_j-x_t)^2+(y_j-Ax_t-C)^2+z_{jt}^2}= \qquad \text{Eq. 36}$$
$$\frac{-R_{kj}^2+(x_k^2-x_j^2)+(y_k^2-y_j^2)+}{2R_{kj}}$$
$$\frac{(z_{kt}^2-z_{jt}^2)+2x_t x_{jk}+2(Ax_t+C)y_{jk}}{2R_{kj}}$$

Rearranging and expanding certain terms on the left side of Equation 36 yields:

$$\sqrt{x_j^2-2x_t x_j+x_t^2+A^2 x_t^2-2Ax_t(y_j-C)+(y_j-C)^2+z_{jt}^2}= \qquad \text{Eq. 37}$$
$$\frac{-R_{kj}^2+(x_k^2-x_j^2)+(y_k^2-y_j^2)+}{2R_{kj}}$$
$$\frac{(z_{kt}^2-z_{jt}^2)+2x_t x_{jk}+2(Ax_t+C)y_{jk}}{2R_{kj}}$$

Multiplying certain terms through on the right side of Equation 37 yields:

$$\sqrt{x_j^2-2x_t x_j+x_t^2+A^2 x_t^2-2Ax_t(y_j-C)+(y_j-C)^2+z_{jt}^2}= \qquad \text{Eq. 38}$$
$$\frac{-R_{kj}^2+(x_k^2-x_j^2)+(y_k^2-y_j^2)+(z_{kt}^2-z_{jt}^2)+}{2R_{kj}}$$
$$\frac{2x_t x_{jk}+2y_{jk}Ax_t+2Cy_{jk}}{2R_{kj}}$$

Factoring out like terms, regrouping certain terms, and separating fractional terms on the right side of Equation 38 yields:

$$\sqrt{x_t^2(1+A^2)+x_t(-2x_j-2A(y_j-C))+(x_j^2+(y_j-C)^2+z_{jt}^2)}= \qquad \text{Eq. 39}$$
$$\frac{-R_{kj}^2+(x_k^2-x_j^2)+(y_k^2-y_j^2)+(z_{kt}^2-z_{jt}^2)+2Cy_{jk}}{2R_{kj}}+x_t\frac{x_{jk}+y_{jk}A}{R_{kj}}$$

Alternate symbols may now be used to represent constant terms in Equation 39:

$$D = 1 + A^2 \qquad \text{Eq. 40}$$

$$E = -2x_j - 2A(y_j - C) \qquad \text{Eq. 41}$$

$$F = x_j^2 + (y_j - C)^2 + z_{jt}^2 \qquad \text{Eq. 42}$$

$$G = \frac{x_{jk}+y_{jk}A}{R_{kj}} \qquad \text{Eq. 43}$$

$$H = \frac{-R_{kj}^2+(x_k^2-x_j^2)+(y_k^2-y_j^2)+(z_{kt}^2-z_{jt}^2)+2Cy_{jk}}{2R_{kj}} \qquad \text{Eq. 44}$$

The symbols of Equations 40-44 may now be substituted into Equation 39 to yield:

$$\sqrt{x_t^2 D + x_t E + F} = x_t G + H \qquad \text{Eq. 45}$$

Squaring both sides of Equation 45 yields:

$$x_t^2 D + x_t E + F = x_t^2 G^2 + 2x_t GH + H^2 \qquad \text{Eq. 46}$$

Factoring out like terms and rearranging terms between both sides of Equation 46 yields:

$$x_t^2 (D - G^2) + x_t (E - 2GH) + (F - H^2) = 0 \qquad \text{Eq. 47}$$

Alternate symbols may be used to simplify Equation 47 as follows:

$$J = D - G^2 \qquad \text{Eq. 48}$$

$$K = E - 2GH \qquad \text{Eq. 49}$$

$$L = F - H^2 \qquad \text{Eq. 50}$$

Substituting the alternate symbols from Equations 48-50 into Equation 47 yields:

$$x_t^2 J + x_t K + L = 0 \qquad \text{Eq. 51}$$

Equation 51 is now in the form of a quadratic equation. It is now possible to solve for $x_t$ using the quadratic formula shown below.

$$x_t = \frac{-K \pm \sqrt{K^2 - 4JL}}{2J} \qquad \text{Eq. 52}$$

Solving for $x_t$ may yield both a positive and a negative root. By convention, it may be determined that the negative root indicates that the vehicle 100A is positioned behind the vehicle 100B. Similarly, a positive root may indicate that the vehicle 100A is positioned in front of the vehicle 100B. Other conventions may be used according to one or more alternate embodiments of the disclosure. Equation 52 may be substituted back into equation 33 to solve for $y_t$. Because it is assumed that the distances between the signal sensor 102 and the signal sources 101A-101C along the z-axis are known, and thus that $z_t$ (which represents a z-coordinate of the signal sensor $A_t$ with respect to the coordinate system 104) is known, solving for $x_t$ and $y_t$ will yield the spatial coordinate $<x_t, y_t, z_t>$ for the signal sensor $A_t$ (e.g., the signal sensor 102) within the coordinate system 104. Determining the spatial coordinate $<x_t, y_t, z_t>$ for the signal sensor $A_t$ within the coordinate system 104 provides a measure of a position of the vehicle 100A in relation to the vehicle 100B.

Although the above positioning technique has been described through reference to the embodiment of the disclosure depicted in FIG. 1A, the technique is equally applicable to other embodiments of the disclosure, including the embodiment depicted in FIG. 1B as well as other embodiments in which additional signal source(s) and additional signal sensor(s) are provided.

Figure 4:
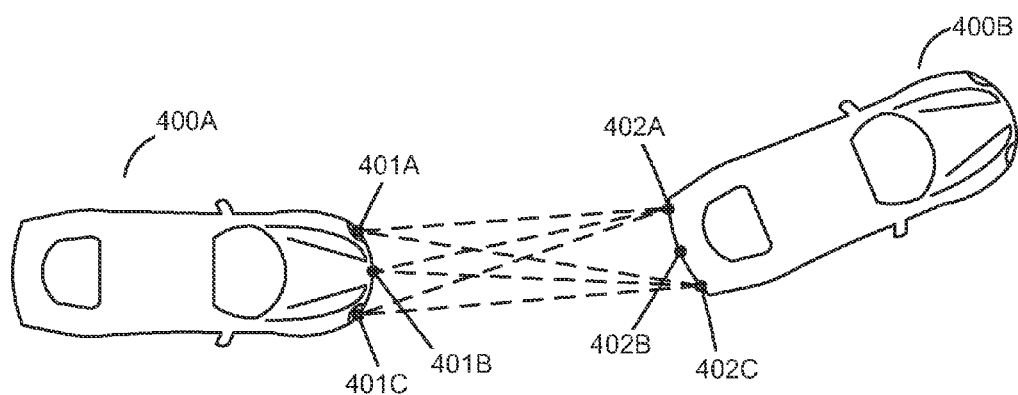
FIG. 4 is a schematic depiction of an interaction between vehicles in accordance with one or more additional embodiments of the disclosure.

FIG. 4 depicts certain embodiments of the disclosure in which multiple signal sources and multiple signal sensors are used to determine multiple positions between a vehicle 400A and a vehicle 400B. In one or more embodiments of the disclosure, elements 402A-402C may represent three signal sources associated with the vehicle 400B. The signal sources 402A-402C may be of a type previously described. Elements 401A-401C may represent three signal sensors associated with the vehicle 400A. The signal sensors 401A-401C may be of a type previously described. Each of the signal sensors 401A-401C may receive a signal from each of the signal sources 402A-402C. Using the technique previously described, a position associated with each of the signal sources 402A-402C within a coordinate system defined in relation to vehicle 400A may be determined. An angular deviation and displacement of vehicle 400B with respect to vehicle 400A may be determined based on the determined position(s).

In one or more alternate embodiments of the disclosure, elements 402A-402C may represent three signal sensors associated with the vehicle 400B. The signal sensors 402A-402C may be of a type previously described. Elements 401A-401C may represent three signal sources associated with the vehicle 400A. The signal sources 401A-401C may be of a type previously described. Each of the signal sensors 402A-402C may receive a signal from each of the signal sources 401A-401C. Using the technique previously described, a position associated with each of the signal sensors 402A-402C within a coordinate system defined in relation to the vehicle 400A may be determined. An angular deviation and displacement of vehicle 400B with respect to vehicle 400A may be determined based on the determined position(s).

Figure 5:
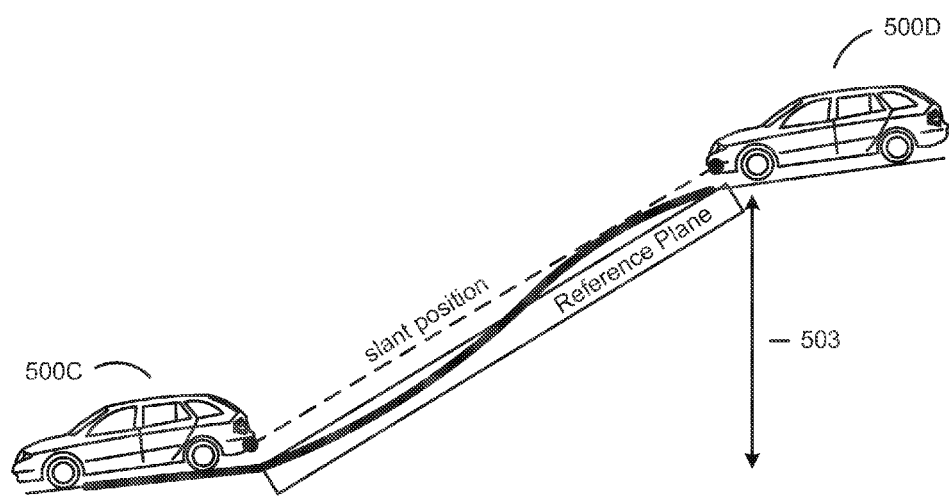
FIG. 5 is a schematic depiction of an interaction between vehicles in accordance with one or more additional embodiments of the disclosure.

The one or more positions between vehicles, determined using the positioning technique described above, may represent slant positions between the vehicles. Referring to FIG. 5, for example, one or more positions of a vehicle 500C in relation to a vehicle 500D, or vice versa, may be determined based on a positioning technique according to embodiments of the disclosure, and may represent slant positions between the vehicle 500C and the vehicle 500D. The slant positions may be defined along a reference plane that may extend through origins of coordinate systems associated with the vehicles 500C and 500D. As previously discussed, the height separation 503 between the vehicle 500C and the vehicle 500D may represent a known distance (a constant) along a z-axis of a coordinate plane defined in relation to the vehicle 500C or the vehicle 500D.

Embodiments described herein may be implemented using hardware, software, and/or firmware, for example, to perform the methods and/or operations described herein. Certain embodiments described herein may be provided as a tangible, non-transitory machine-readable medium storing machine-executable instructions that, if executed by a machine, cause the machine to perform the methods and/or operations described herein. The tangible machine-readable medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device, or system and may be implemented using any suitable combination of hardware and/or software. The instructions may include any suitable type of code and may be implemented using any suitable programming language. In certain embodiments, machine-executable instructions for performing the methods and/or operations described herein may be embodied in software embodied in any of one or more higher-level programming languages capable of being compiled or interpreted, microcode, or firmware.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation. In the use of such terms and expressions, there is no intention of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the disclosure have been described in connection with what is presently considered to be the most practical and various embodiments, it is to be understood that the disclosure is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the disclosure, including the best mode, and also to enable any person skilled in the art to practice certain embodiments of the disclosure, including making and using any devices or systems and performing any incorporated methods. The patentable scope of certain embodiments of the disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method, comprising:
   detecting, at a signal detecting unit associated with a first vehicle, one or more signals received from one or more signal sources, the signal detecting unit comprising one or more signal sensors and one or more computer processors;
   determining, by the one or more computer processors, a set of time values based on arrival times of the one or more signals;
   generating, by the one or more computer processors, a set of distance expressions, wherein each distance expression corresponds to a distance between one of the one or more signal sensors and one of the one or more signal sources;
   generating, by the one or more computer processors, a set of distance equations based at least in part on the set of time values and the set of distance expressions; and
   solving, by the one or more computer processors, the set of distance equations to determine a first position or a second position, wherein the first position represents a position associated with the first vehicle within a coordinate system defined in relation to the one or more signal sources, and the second position represents a position associated with the one or more signal sources within a coordinate system defined in relation to the first vehicle.

2. The method of claim 1 wherein the one or more signal sensors comprise at least three signal sensors positioned on the first vehicle and the one or more signals comprise a signal received by each of the at least three signal sensors from one signal source.

3. The method of claim 1, wherein the one or more signals comprise at least three signals received from at least three respective corresponding signal sources.

4. The method of claim 1, wherein the set of time values comprises a difference in the arrival time, at the signal detecting unit, of each of the one or more signals in relation to the arrival time of each of the other one or more signals, and each distance equation represents a difference between one distance expression and one other distance expression.

5. The method of claim 1, further comprising:
   outputting, by the one or more computer processors, the first position or the second position to at least one of a user interface or one or more control units of the first vehicle.

6. The method of claim 5, wherein the one or more control units are configured to control one or more components of the first vehicle based at least in part on the first position or the second position.

7. The method of claim 1, wherein the set of time values is determined based on phase differences among the one or more signals detected by the signal detecting unit.

8. The method of claim 1, wherein each of the one or more signals is a modulated signal that conveys information relating to a respective corresponding signal source positioned on a second vehicle, the information comprising at least one of an identifier associated with the second vehicle or a spatial coordinate associated with the respective corresponding signal source.

9. The method of claim 1, further comprising:
   solving, by the one or more computer processors, the set of distance equations to determine a third position or a fourth position, wherein the third position represents another position associated with the first vehicle within the coordinate system defined in relation to the one or more signal sources, and the fourth position represents another position associated with the one or more signal sources within the coordinate system defined in relation to the first vehicle; and
   determining, by the one or more computer processors, an angular deviation between the first vehicle and a second vehicle based at least in part on the first and third positions or based at least in part on the second and fourth positions.

10. A system comprising:
    a signal detecting unit associated with a first vehicle, the signal detecting unit comprising one or more signal sensors and one or more computer processors, wherein the signal detecting unit is configured to detect one or more signals received from one or more signal sources, and wherein the one or more processors are configured to:
    determine a set of time values based on arrival times of the one or more signals;
    generate a set of distance expressions, wherein each distance expression corresponds to a distance between one of the one or more signal sensors and one of the one or more signal sources;
    generate a set of distance equations based at least in part on the set of time values and the set of distance expressions; and
    solve the set of distance equations to determine a first position or a second position, wherein the first position represents a position associated with the first vehicle within a coordinate system defined in relation to the one or more signal sources, and the second position represents a position associated with the one or more signal sources within a coordinate system defined in relation to the first vehicle.

11. The system of claim 10, wherein the one or more signal sensors comprise at least three signal sensors positioned on the first vehicle and the one or more signals comprise a signal received by each of the at least three signal sensors from one signal source.

12. The system of claim 10, wherein the one or more signals comprise at least three signals received from at least three respective corresponding signal sources.

13. The system of claim 10, wherein the set of time values comprises a difference in the arrival time, at the signal detecting unit, of each of the one or more signals in relation to the arrival time of each of the other one or more signals, and each distance equation represents a difference between one distance expression and one other distance expression.

14. The system of claim 10, wherein the one or more computer processors are further configured to:
output the first position or the second position to at least one of a user interface or one or more control units of the first vehicle.

15. The system of claim 14, wherein the one or more control units are configured to control one or more components of the first vehicle based on the first position or the second position.

16. The system of claim 10, wherein the set of time values is determined based on phase differences among the one or more signals detected by the signal detecting unit.

17. The system of claim 10, wherein each of the one or more signals is a modulated signal that conveys information relating to a respective corresponding signal source positioned on a second vehicle, the information comprising at least one of an identifier associated with the second vehicle or a spatial coordinate associated with the respective corresponding signal source.

18. The system of claim 10, wherein the one or more computer processors are further configured to:
solve the set of distance equations to determine a third position or a fourth position, wherein the third position represents another position associated with the first vehicle within the coordinate system defined in relation to the one or more signal sources, and the fourth position represents another position associated with the one or more signal sources within the coordinate system defined in relation to the first vehicle; and
determine an angular deviation between the first vehicle and a second vehicle based at least in part on the first and third positions or based at least in part on the second and fourth positions.

19. One or more non-transitory computer-readable media storing computer-executable instructions that responsive to execution by one or more computer processors causes operations to be performed comprising:
detecting, at a signal detecting unit associated with a first vehicle, one or more signals received from one or more signal sources;
determining a set of time values based on arrival times of the one or more signals;
generating a set of distance expressions, wherein each distance expression corresponds to a distance between one of the one or more signal sensors and one of the one or more signal sources;
generating a set of distance equations based at least in part on the set of time values and the set of distance expressions; and
solving the set of distance equations to determine a first position or a second position, wherein the first position represents a position associated with the first vehicle within a coordinate system defined in relation to the one or more signal sources, and the second position represents a position associated with the one or more signal sources within a coordinate system defined in relation to the first vehicle.

20. The one or more computer-readable media of claim 19, wherein the one or more signal sensors comprise at least three signal sensors positioned on the first vehicle and the one or more signals comprise a signal received by each of the at least three signal sensors from one signal source.

21. The one or more computer-readable media of claim 19, wherein the one or more signals comprise at least three signals received from at least three respective corresponding signal sources.

22. The one or more computer-readable media of claim 19, the operations further comprising:
outputting the first position or the second position to at least one of a user interface or one or more control units of the first vehicle.

23. The one or more computer-readable media of claim 19, the operations further comprising:
solving the set of distance equations to determine a third position or a fourth position, wherein the third position represents another position associated with the first vehicle within the coordinate system defined in relation to the one or more signal sources, and the fourth position represents another position associated with the one or more signal sources within the coordinate system defined in relation to the first vehicle; and
determining an angular deviation between the first vehicle and a second vehicle based at least in part on the first and third positions or based at least in part on the second and fourth positions.

* * * * *